United States Patent
Akashi et al.

(10) Patent No.: US 10,024,225 B2
(45) Date of Patent: Jul. 17, 2018

(54) CONTROLLER OF INTERNAL COMBUSTION ENGINE EQUIPPED WITH ELECTRIC SUPERCHARGER

(71) Applicants: Yohei Akashi, Tokyo (JP); Hideyuki Tanaka, Tokyo (JP)

(72) Inventors: Yohei Akashi, Tokyo (JP); Hideyuki Tanaka, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 488 days.

(21) Appl. No.: 13/709,282

(22) Filed: Dec. 10, 2012

(65) Prior Publication Data
US 2013/0255647 A1 Oct. 3, 2013

(30) Foreign Application Priority Data
Mar. 27, 2012 (JP) .................................. 2012-070929

(51) Int. Cl.
*F02B 33/00* (2006.01)
*F02B 33/34* (2006.01)
(Continued)

(52) U.S. Cl.
CPC .............. *F02B 33/00* (2013.01); *F02B 33/34* (2013.01); *F02B 39/10* (2013.01); *F02D 23/00* (2013.01);
(Continued)

(58) Field of Classification Search
CPC .......... F02B 33/00; F02B 33/34; F02B 39/10; F02D 23/00; F02D 29/06; F02D 41/0007; F02D 41/10; H02J 7/14; Y02T 10/144
See application file for complete search history.

(56) References Cited

U.S. PATENT DOCUMENTS 4,901,530 A * 2/1990 Kawamura ..................... 60/608
5,881,559 A * 3/1999 Kawamura ..................... 60/597
(Continued)

FOREIGN PATENT DOCUMENTS

EP 0 994 362 A2 4/2000
JP 02-088981 A 3/1990
(Continued)

OTHER PUBLICATIONS

English Translation JP 2002004911 A.*
(Continued)

*Primary Examiner* — Mark Laurenzi
*Assistant Examiner* — Shafiq Mian
(74) *Attorney, Agent, or Firm* — Sughrue Mion, PLLC; Richard C. Turner

(57) ABSTRACT

In a controller of an internal combustion engine equipped with an electric supercharger driven by a motor, an object is to attempt to improve fuel consumption of a vehicle.
The controller includes an electric supercharger driven by a motor; a generator that performs power generation using the output of the internal combustion engine as power; a charging device which is charged by the generator and can store electricity; and an accelerator opening degree detector that detects an accelerator opening degree. In the controller, a configuration is made such that, the controller controls supply electricity to the electric supercharger and generated electricity by the generator by the output of the accelerator opening degree detector, output needed for the electric supercharger calculated depending on the accelerator opening degree, and an state of charge in the charging device.

8 Claims, 5 Drawing Sheets

(51) Int. Cl.
  *F02B 39/10* (2006.01)
  *F02D 23/00* (2006.01)
  *F02D 29/06* (2006.01)
  *F02D 41/10* (2006.01)
  *F02D 41/00* (2006.01)

(52) U.S. Cl.
  CPC .......... *F02D 29/06* (2013.01); *F02D 41/0007* (2013.01); *F02D 41/10* (2013.01); *Y02T 10/144* (2013.01)

(56) References Cited

U.S. PATENT DOCUMENTS

| | | | |
|---|---|---|---|
| 6,163,133 A | 12/2000 | Laig-Horstebrock et al. | |
| 6,922,995 B2* | 8/2005 | Kawamura et al. | 60/608 |
| 7,628,015 B2* | 12/2009 | Marumoto | F02B 33/34 60/607 |
| 8,143,732 B2* | 3/2012 | Algrain | 290/1 A |
| 8,522,756 B2* | 9/2013 | Vuk et al. | 123/568.12 |
| 8,522,757 B2* | 9/2013 | Vuk | 123/568.12 |
| 8,601,810 B2* | 12/2013 | Tanaka et al. | 60/602 |
| 8,763,385 B2* | 7/2014 | Leone et al. | 60/397 |
| 2004/0194466 A1* | 10/2004 | Kawamura | F02B 33/34 60/612 |
| 2007/0144175 A1* | 6/2007 | Sopko et al. | 60/605.1 |
| 2008/0022686 A1* | 1/2008 | Amdall et al. | 60/716 |
| 2010/0170245 A1* | 7/2010 | Amos et al. | 60/607 |
| 2010/0275890 A1* | 11/2010 | McDonald-Walker | B60K 6/24 123/564 |
| 2011/0022289 A1* | 1/2011 | Hofbauer | 701/103 |
| 2011/0094224 A1* | 4/2011 | Sheidler et al. | 60/605.2 |
| 2012/0017585 A1* | 1/2012 | Shimizu et al. | 60/602 |
| 2012/0055153 A1* | 3/2012 | Murata et al. | 60/602 |
| 2012/0124992 A1* | 5/2012 | Fiveland | 60/599 |
| 2012/0210952 A1* | 8/2012 | Reuss et al. | 123/2 |
| 2013/0074495 A1* | 3/2013 | Chi et al. | 60/605.2 |
| 2013/0092126 A1* | 4/2013 | Leone et al. | 123/399 |
| 2013/0174544 A1* | 7/2013 | Valetutti | F02G 5/02 60/598 |
| 2014/0015257 A1* | 1/2014 | Dobbs | 290/40 B |

FOREIGN PATENT DOCUMENTS

| | | | |
|---|---|---|---|
| JP | 02-181025 A | | 7/1990 |
| JP | 2002-004911 A | | 1/2002 |
| JP | 2002004911 A | * 1/2002 | .......... F02D 29/06 |
| JP | 2005-240580 A | | 9/2005 |
| JP | 2011-169286 A | | 9/2011 |

OTHER PUBLICATIONS

Japanese Office Action dated Apr. 9, 2013 in a corresponding Japanese Patent Application No. 2012-070929.
German Office Action dated Apr. 7, 2014, Patent Application No. 10 2013 202 175.5.

* cited by examiner

CONTROLLER OF INTERNAL COMBUSTION ENGINE EQUIPPED WITH ELECTRIC SUPERCHARGER

BACKGROUND OF THE INVENTION

1. Field of the Invention

The present invention relates to a controller of an internal combustion engine equipped with an electric supercharger that is driven by a motor and, more particularly, relates to a controller that attempts to improve fuel consumption of a vehicle.

2. Description of the Related Art

In recent years, there has been widely known a technology of downsizing which reduces a mechanical loss such as a pumping loss and a friction loss of an internal combustion engine to improve efficiency and fuel consumption of the internal combustion engine, the mechanical loss being reduced by reducing displacement while maintaining output by a supercharger for the purpose of improving the fuel consumption of the internal combustion engine. In order to perform this downsizing, there exists a technique of an electric supercharger in which a motor is mounted on the supercharger; and there is known a technique in which a driving voltage of the motor is changed from existing 12 V to a high voltage of 48 V or 100 V for the purpose of improving the output of the electric supercharger. In this case, a concern is that the amount of charge in a charging device is exhausted for a short period of time unless power generation is performed by a generator for an increase in electricity consumption during operation of the electric supercharger; however, a problem exists in that it is difficult to satisfy both securement of the amount of charge and the output of the internal combustion engine because the generator also uses power of the internal combustion engine.

As countermeasures against such a problem, there has been proposed a technique in which in the case where the amount of charge (state of charge, hereinafter, referred to as "SOC") in a charging device is sufficient when supercharging by an electric supercharger is needed, power generation is not performed, but the electric supercharger is made to operate by electricity from the charging device; and accordingly, the output of an internal combustion engine is secured. (Patent Document 1)

Furthermore, there has been proposed a technique in which, in a system which includes an electric supercharger and a motor generator that can drive and perform power generation, the motor generator assists the driving of a vehicle when an SOC in a charging device is high, but supercharging by the electric supercharger is performed when the SOC in the charging device lowers; and accordingly, the output of an internal combustion engine is secured. (Patent Document 2)

[Patent Document 1] Japanese Unexamined Patent Publication No. 2011-169286

[Patent Document 2] Japanese Unexamined Patent Publication No. 2005-240580

However, in Patent Document 1, control of the electric supercharger and the generator is performed to secure power of a vehicle in a state where a required supercharging pressure is high and the SOC in the charging device is high, and power generation is always performed during normal supercharging; and therefore, a problem exists in that the operating efficiency and fuel consumption of the vehicle are not taken into consideration.

Furthermore, also in Patent Document 2, control of the electric supercharger and the motor generator is performed, but the control is to secure power of acceleration force or the like by controlling both operation depending on the SOC in the charging device; and therefore, a problem exists in that the operating efficiency and fuel consumption of the vehicle are not taken into consideration.

BRIEF SUMMARY OF THE INVENTION

In view of the foregoing problems, in a vehicle having an internal combustion engine equipped with an electric supercharger and a generator, the present invention is to provide a controller of an internal combustion engine equipped with an electric supercharger, the controller being capable of obtaining good efficiency and fuel consumption of a vehicle while obtaining acceleration that fulfills a driver's acceleration request.

According to the present invention, there is provided a controller of an internal combustion engine, the controller including: an electric supercharger which is arranged in an intake air path of the internal combustion engine and is driven by a motor; a generator which performs power generation using the output of the internal combustion engine as power; a charging device which is charged by the generator and can store electricity; and an accelerator opening degree detector which detects an accelerator opening degree. In the controller, a configuration is made such that the controller controls supply electricity to the electric supercharger and generated electricity by the generator by the output of the accelerator opening degree detector, output needed for the electric supercharger calculated depending on the accelerator opening degree, and an state of charge in the charging device.

According to the present invention, in a controller of an internal combustion engine equipped with an electric supercharger, driving electricity of the electric supercharger and the amount of power generation of a generator are controlled depending on an SOC in a charging device and an accelerator opening degree, thereby enabling to achieve suitable fuel consumption while achieving torque required by a driver.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

Hereinafter, the present invention will be described with reference to drawings of a working example.

Figure 1:
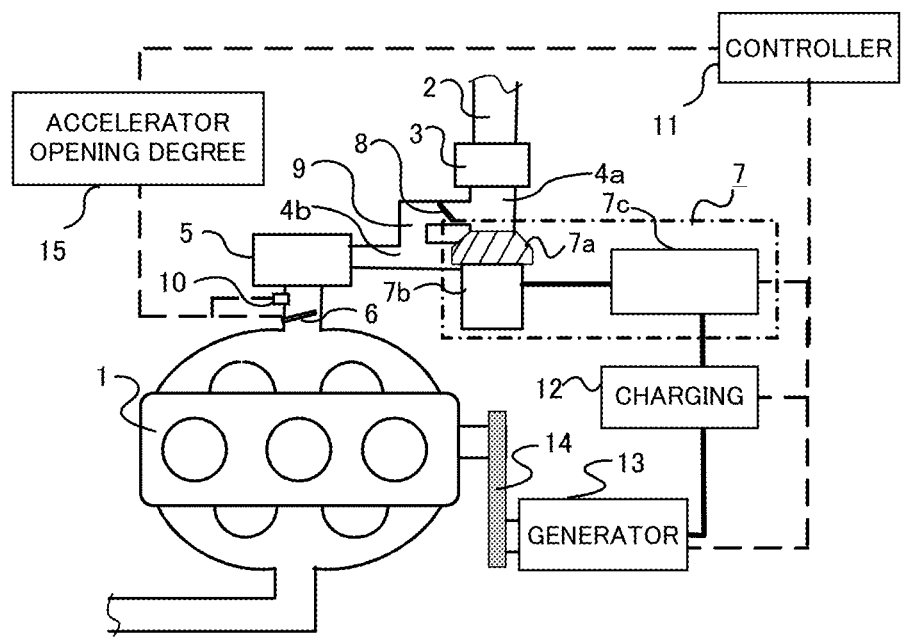
FIG. 1 is a general outline view showing a relevant part configuration of a vehicle to which a controller of an internal combustion engine equipped with an electric supercharger according to Embodiment 1 of the present invention is applied.

FIG. 1 is a general outline view showing a relevant part configuration of a vehicle in which a controller of an internal combustion engine according to Embodiment 1 of the present invention is applied.

In FIG. 1, in an internal combustion engine 1, external air is supplied into a cylinder via an intake air path 2, an air cleaner 3, an upstream path 4a, a downstream path 4b, an intercooler 5, and a throttle valve 6. Furthermore, an electric supercharger 7 is provided between an upstream path 4a and a downstream path 4b to be capable of compressing intake air to be supplied to the intercooler 5 and supplying the intake air to the internal combustion engine 1 via a bypass path 9 having an electric supercharger bypass valve 8. Further, a sensor (air flow sensor or pressure sensor) 10 that measures the amount of air intake and the pressure of air to be sucked into the internal combustion engine 1 is arranged on the upstream side of the throttle valve 6.

Incidentally, the throttle valve 6 is opened and closed in accordance with an accelerator operation performed by a driver to control an operating state of the internal combustion engine 1; and the intercooler 5 lowers the temperature of intake air whose temperature rises with arise in pressure by supercharging to improve filling efficiency.

Furthermore, a three cylinder internal combustion engine is exemplified as the example of the internal combustion engine 1; however, more particularly, the number of cylinders of the internal combustion engine is not limited, and the internal combustion engine 1 may be not only a direct injection type internal combustion engine that injects fuel into the cylinder but also a port injection type internal combustion engine that injects fuel into an intake air path on the posterior of the throttle valve 6.

By the way, the electric supercharger 7 is composed of a compressor impeller 7a, a motor for an electric supercharger 7b that drives the compressor impeller 7a, and a controller of an electric supercharger 7c that controls the motor for the electric supercharger 7b. The electric supercharger 7 has the function of compressing air sucked in the upstream path 4a to be flown into the downstream path 4b.

In this case, when the vehicle is in an operating range that is not needed for driving the electric supercharger 7, the electric supercharger 7 is flow path resistance of the intake air; and therefore, the intake air can be supplied to the internal combustion engine 1 via the bypass path 9 by opening the electric supercharger bypass valve 8. Furthermore, also when the throttle 6 is suddenly closed from a supercharged state, it is possible to have the function of lowering the pressure of the downstream path 4b of the electric supercharger 7 by opening the electric supercharger bypass valve 8.

Further, a control target value is inputted from a controller 11 to the electric supercharger 7 based on the output of various types of the sensors and driving electricity is supplied from a charging device 12.

A configuration is made such that electricity is supplied and charged to the charging device 12 by a generator 13 and operation states such as internal resistance, voltage, and temperature are detected by an internal state detector.

On the other hand, a configuration is made such that the generator 13 is controlled by the controller 11 and is connected to the internal combustion engine 1 via a belt 14 to perform power generation associated with the rotation of the internal combustion engine 1.

Incidentally, the controller of the electric supercharger 7c also includes a microcomputer for driving the motor for the electric supercharger 7b and an inverter that converts electricity, which is inputted from the charging device 12, into driving electricity of the motor for the electric supercharger 7b.

By the way, generated power of the generator 13 is obtained from the internal combustion engine 1; and therefore, power needed for power generation is reduced from the output of the internal combustion engine 1 during power generation.

Next, the operation of the controller of the internal combustion engine equipped with the electric supercharger will be described with reference to a flow chart shown in FIG. 2.

Figure 2:
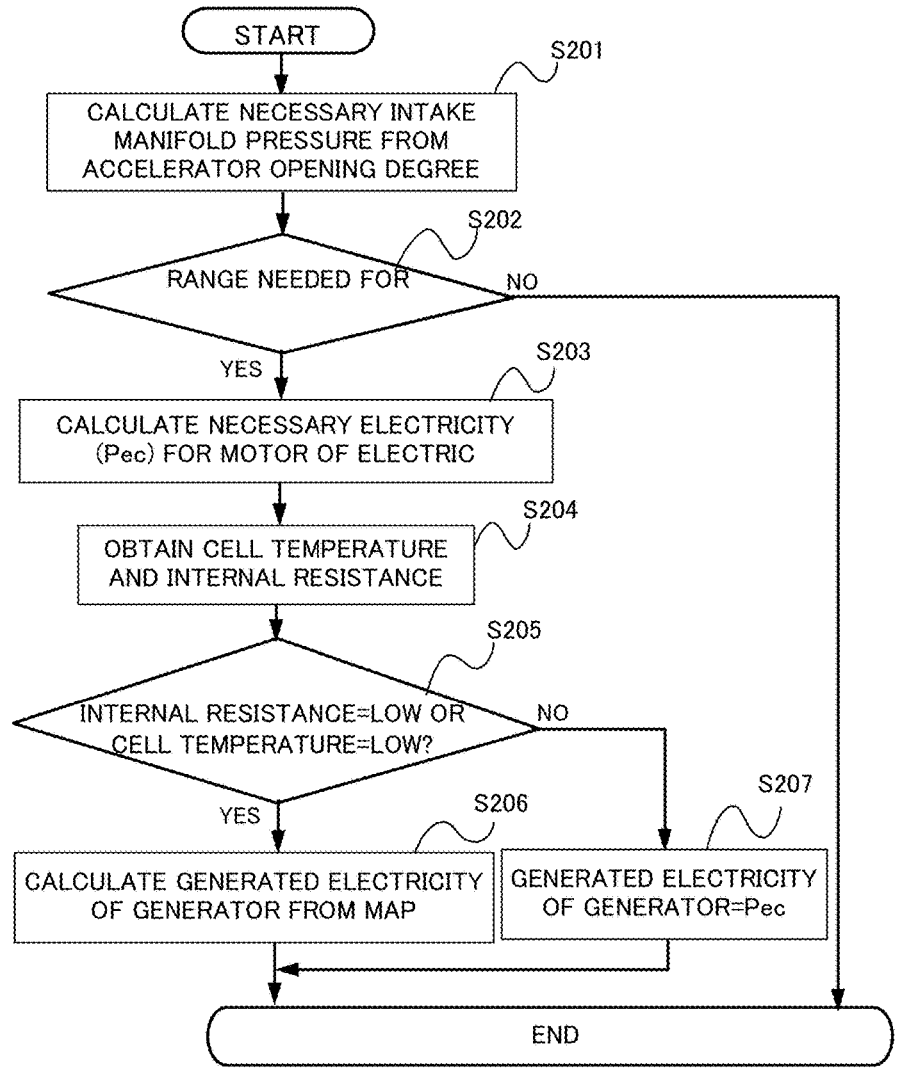
FIG. 2 is a flowchart for explaining operation according to Embodiment 1 of the present invention.

In FIG. 2, first, an accelerator opening degree associated with an accelerator pedal operation of the driver is detected and an intake manifold pressure needed for the internal combustion engine 1 is calculated and stored in step S201. Next, in step S202, a judgment is made whether or not the intake manifold pressure is in a vehicle's operating range needed for supercharging, and the electric supercharger 7 is not made to operate and the flow is completed in the case where the intake manifold pressure is not in the range needed for supercharging.

In the case where a judgment is made that supercharging is needed in step S202, the amount of electricity needed for the electric supercharger 7 is calculated in step S203. At this time, necessary electricity Pec is made to hold in a memory as a map from an operating point of the internal combustion engine 1 needed for required driving force; and the electricity Pec needed for the electric supercharger 7 may be found by reading out the map or by dividing the amount of work of the electric supercharger 7 by at least one of impeller efficiency ηimpeller, motor efficiency ηmotor, and inverter efficiency ηinverter, the amount of work being found by multiplying the amount of air flow Q (output of an air flow sensor) passing through the electric supercharger 7 and a target supercharged pressure p (output of a supercharged pressure sensor) of the electric supercharger 7.

Next, an SOC in a battery and internal resistance are detected by the internal state detector of the charging device 12 in step S204; and the size of the internal resistance value and the cell temperature of the charging device 12 is determined in step S205.

Figure 3:
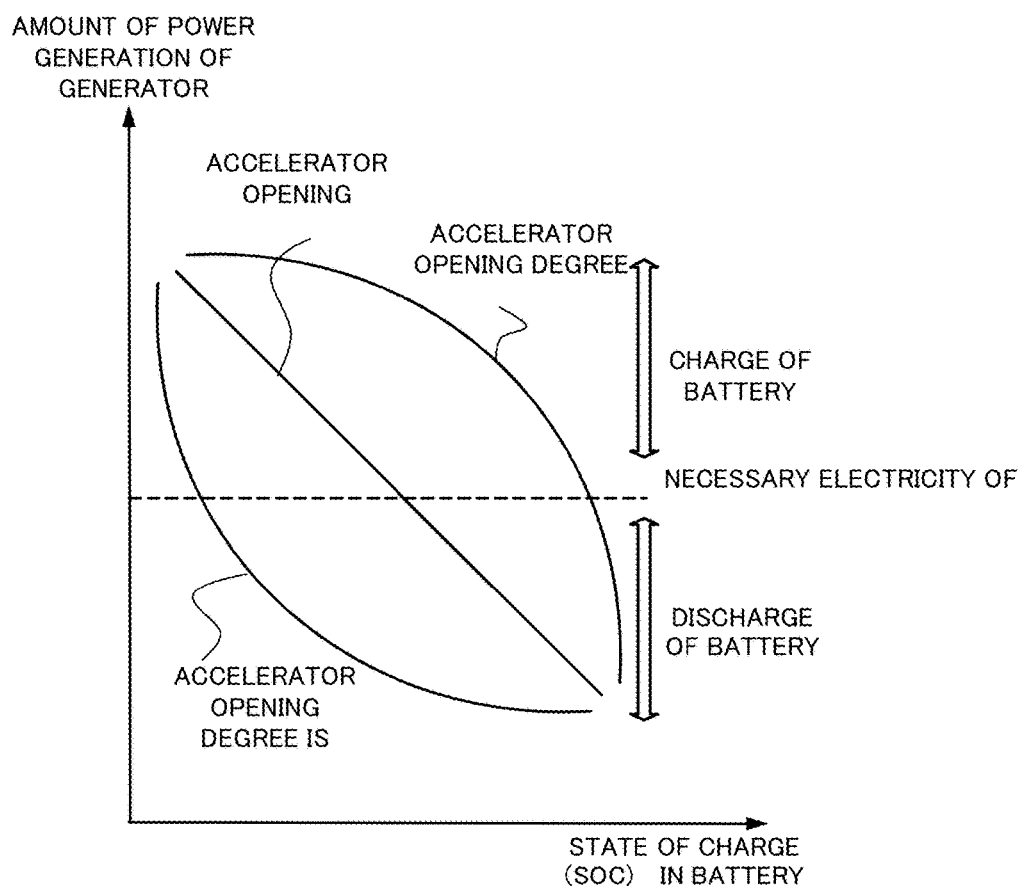
FIG. 3 is a map that defines the ratio of the operation of the electric supercharger to a generator according to Embodiment 1 of the present invention.

When the internal resistance of the charging device 12 is low, generated electricity of the generator 13 is decided in step S206 by a map as shown in FIG. 3 based on necessary electricity Pec of the electric supercharger 7, the accelerator opening degree found in step S201, and the SOC in the battery.

FIG. 3 shows that the amount of power generation is made to be small when the SOC in the battery is high, and the amount of power generation is made to be large when the SOC in the battery is low; when the accelerator opening degree is small, the amount of power generation is made to be large even at high SOC as compared to the case where the accelerator opening degree is medium; and when the accelerator opening degree is large, the amount of power generation is made to be reduced even at low SOC. Accordingly, it becomes possible to control such that power generation is not performed as much as possible in the case where the internal combustion engine 1 does not have reserve power even when the SOC in the battery reduces; and power generation is performed preferably in the case where the internal combustion engine 1 has reserve power even when the SOC in the battery is large.

Figure 4:
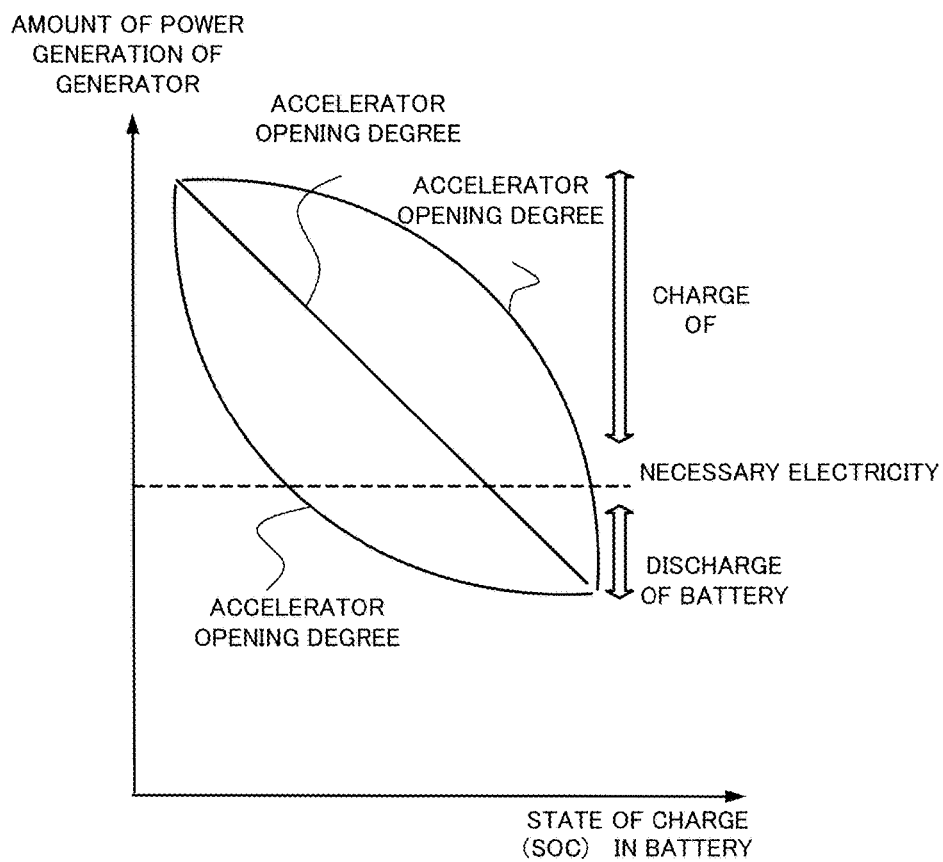
FIG. 4 is a map that defines the ratio of the operation of the electric supercharger to the generator according to Embodiment 1 of the present invention when the efficiency of the electric supercharger and the generator is good.

In this case, the efficiency of the electric supercharger 7 and the efficiency of the generator 13 are different depending on the engine operating point and a field current of the generator 13; and therefore, the map may be changed depending on the efficiency of the electric supercharger 7 and the efficiency of the generator 13. That is, in the case of an engine operating point in which the efficiency of the electric supercharger 7 is good and the efficiency of the generator 13 is good, as shown in FIG. 4, the generator 13 is made to operate actively and its power makes the electric supercharger 7 operate and accordingly electricity is recovered and stored in the charging device 12.

Figure 5:
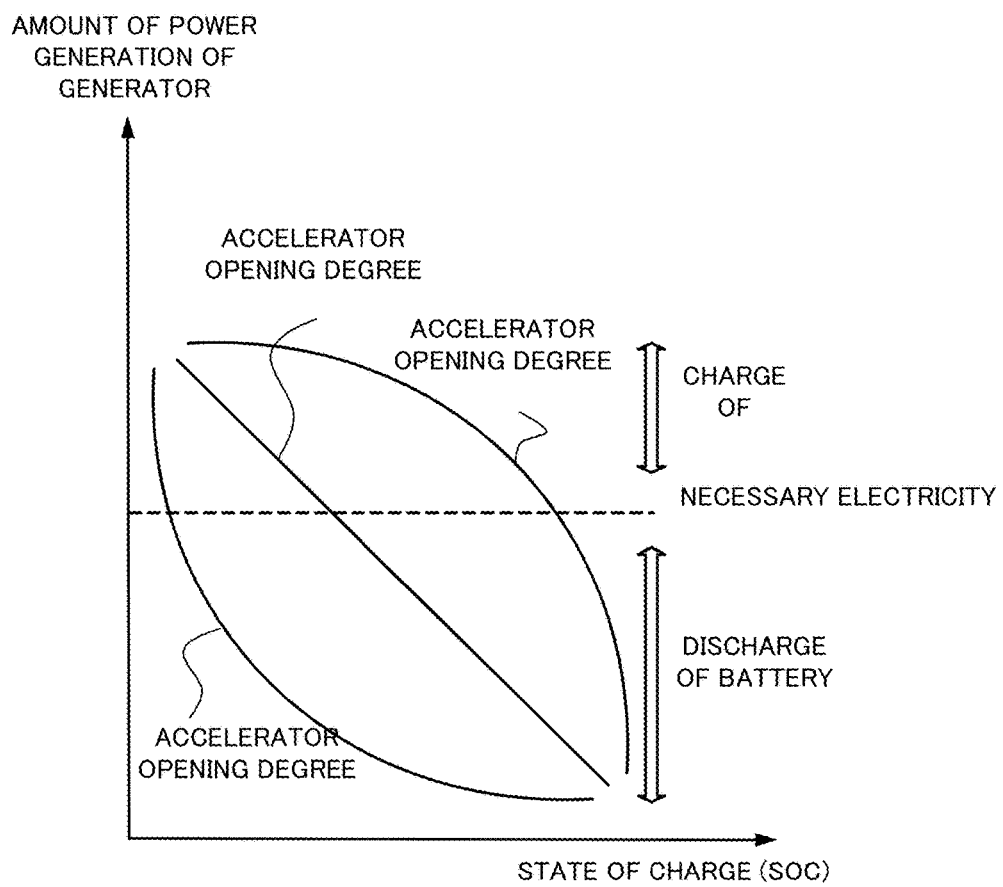
FIG. 5 is a map that defines the ratio of the operation of the electric supercharger to the generator according to Embodiment 1 of the present invention when the efficiency of the electric supercharger and the generator is bad.

Furthermore, in the case of an engine operating point in which the efficiency of the electric supercharger 7 is bad and the efficiency of the generator 13 is bad, as shown in FIG. 5, the generator 13 is not made to operate actively, but the electric supercharger 7 is made to operate by electricity from the charging device 12. Incidentally, in FIG. 3, FIG. 4, and FIG. 5, the relationship between the SOC in the battery and the amount of power generation of the generator is shown by a parabola; however, the relationship may be a stepwise characteristic having a similar tendency.

Next, when a determination is made in step S205 that the internal resistance of the charging device 12 is high and the cell temperature is high, the generated electricity of the generator 13 is made to equal to Pec required by the electric supercharger 7 in step S207. Accordingly, all electricity consumption of the electric supercharger 7 can be covered by the generated electricity of the generator 13; and therefore, electricity output from the charging device 12 and electricity input to the charging device 12 are not generated. As a result, heat generation of the charging device 12 due to the internal resistance can be suppressed.

Usually, the charging device 12 has a tendency that the internal resistance is extremely high when the cell temperature is low; and therefore, if the input or output of electricity of the charging device 12 is performed in this state, loss at the charging device 12 is considerably increased. Therefore, when a determination is made in step S205 that the internal resistance of the charging device 12 is high and the cell temperature is low, the input or output of electricity to the charging device 12 is performed in step S206 for the purpose of improving the loss at the charging device 12 by increasing the cell temperature to reduce the internal resistance of the charging device 12.

By the way, power generation of the generator 13 needs the power of the internal combustion engine 1; and therefore, if the amount of power generation is increased, the output of the internal combustion engine 1 is reduced. Therefore, electric power supply to the electric supercharger 7 and power generation by the generator 13 need to be corrected minutely, but its description will be omitted.

In this case, an increase in output of the internal combustion engine 1 by the electric supercharger 7 generally becomes several times the size of electricity supplied to the electric supercharger 7. Consequently, even when electricity is supplied to the electric supercharger 7 while performing power generation using the output of the internal combustion engine 1 by the generator 13, it becomes possible to increase the output of the internal combustion engine 1 in total.

As described above, according to Embodiment 1, it becomes possible to follow well in response to driving force required by a driver and to perform control of the internal combustion engine with good combustion efficiency and fuel consumption by filling supercharging air to the internal combustion engine by the electric supercharger. Furthermore, it becomes possible to continue driving of the electric supercharger by generating electricity to be applied to the electric supercharger by the generator.

Further, a DC/DC converter is generally mounted as the charging device 12 and the DC/DC converter is designed to supply electricity to vehicle-mounted electrical components by stepping down the voltage (high voltage) of the charging device 12 to approximately 12 v used in existing general vehicles. Therefore, in this case, generated electricity of the generator 13 needs to be controlled taking into consideration of the output of the DC/DC converter.

Furthermore, in Embodiment 1, the description has been made on the example of an electric compressor as the electric supercharger 7; however, the present invention is not limited to this example, but the present invention can also be applied to an electric assist turbo equipped with a turbine driven by exhaust gas of the internal combustion engine in addition to a motor coaxially arranged with the compressor.

In addition, the description has been made on the example of the generator; however, the present invention can also be applied to a vehicle equipped with a hybrid system which includes a motor generator that can drive and regenerate and can drive the vehicle by the motor generator.

A lithium ion battery is generally applied to the charging device 12; however, all power supply systems (not less than 36 v), such as a nickel hydrogen battery, a high voltage capacitor, and the like can be applied to the charging device 12.

Incidentally, in Embodiment 1, power generation can be performed efficiently; and therefore, when a high output of the electric supercharger 7 is continued long term although small frequency, the SOC in the charging device 12 is likely to be completely run down. Thus, a configuration can be made such that a warning device is provided to inform a driver that the SOC lowers.

Furthermore, in the present invention, the embodiment can be appropriately changed or omitted within the scope of the present invention.

What is claimed is:

1. A system for controlling an internal combustion engine equipped with an electric supercharger, said system comprising:

an electric supercharger which is arranged in an intake air path of said internal combustion engine and is driven by an electric motor;

a generator which generates electricity by being rotated mechanically by rotation of said internal combustion engine;

a controller that controls the electric supercharger and the generator;

an electrical storage device which is charged by said generator to store electricity; and an accelerator opening degree detector which detects an accelerator opening degree, wherein said controller is adapted to control electricity supplied to said electric supercharger and an amount of electricity generated by said generator based on an output of said accelerator opening degree detector, an output needed for said electric supercharger calculated depending on the accelerator opening degree, and a state of charge in said electrical storage device.

2. The controller of the internal combustion engine equipped with the electric supercharger according to claim 1,
wherein said controller controls the electricity supplied to said electric supercharger and the electricity generated by said generator based on a map predetermined by the output of said accelerator opening degree detector, the output needed for said electric supercharger calculated depending on the accelerator opening degree, and the state of charge in said electrical storage device.

3. The controller of the internal combustion engine equipped with the electric supercharger according to claim 1,
wherein said controller controls the electricity supplied to said electric supercharger and the electricity generated by said generator based on at least one of an efficiency of said internal combustion engine determined by an operating state of said internal combustion engine, an impeller efficiency of said electric supercharger, the motor efficiency of said electric supercharger, the inverter efficiency of said electric supercharger, and the efficiency of said generator.

4. The controller of the internal combustion engine equipped with the electric supercharger according to claim 1,
further comprising an internal state detector that detects an internal state of said electrical storage device, and
wherein said controller controls the electricity supplied to said electric supercharger and the electricity generated by said generator based on at least one of voltage, temperature, and internal resistance detected by said internal state detector.

5. The controller of the internal combustion engine equipped with the electric supercharger according to claim 4,
wherein said controller equally controls an amount of electricity supplied to said electric supercharger and an amount of electricity generated by said generator when the temperature and the internal resistance of said electrical storage device detected by said internal state detector of said electrical storage device are not less than a predetermined value.

6. The controller of the internal combustion engine equipped with the electric supercharger according to claim 1,
wherein said electrical storage device is any one of a lithium ion battery, a nickel hydrogen battery, and a high voltage capacitor, each being not less than 36 V.

7. The controller of the internal combustion engine equipped with the electric supercharger according to claim 1,
further comprising a warning device that sends out a warning to a driver of a vehicle, and
wherein said warning device is made to operate when the state of charge in said electrical storage device lowers.

8. The controller of the internal combustion engine equipped with the electric supercharger according to claim 1,
wherein the generator which generates electricity by being rotated mechanically is rotated mechanically by a belt.

* * * * *